United States Patent
Suzuki (10) Patent No.: US 6,913,194 B2
(45) Date of Patent: *Jul. 5, 2005

(54) METHOD AND SYSTEM TO PREVENT FRAUDULENT PAYMENT IN CREDIT/DEBIT CARD TRANSACTIONS, AND TERMINALS THEREFOR

(75) Inventor: Koji Suzuki, Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/615,161

(22) Filed: Jul. 7, 2003

(65) Prior Publication Data

US 2004/0004117 A1 Jan. 8, 2004

Related U.S. Application Data

(63) Continuation of application No. 10/001,062, filed on Oct. 31, 2001, now Pat. No. 6,612,488.

(30) Foreign Application Priority Data

Mar. 14, 2001 (JP) .......................................... 2001-071543

(51) Int. Cl.[7] .................................................. G06K 5/00
(52) U.S. Cl. ......................................... 235/380; 235/382
(58) Field of Search ................................ 235/380, 381, 235/382, 385, 462.45, 472.01; 705/39, 44, 64

(56) References Cited

U.S. PATENT DOCUMENTS

| 4,523,087 | A | | 6/1985 | Benton |
| 5,053,883 | A | | 10/1991 | Johnson |
| 5,334,824 | A | | 8/1994 | Martinez |
| 5,650,604 | A | | 7/1997 | Marcous et al. |
| 5,659,165 | A | | 8/1997 | Jennings et al. |
| 5,722,066 | A | | 2/1998 | Hu |
| 6,119,935 | A | * | 9/2000 | Jelen et al. ................. 235/383 |
| 6,267,292 | B1 | | 7/2001 | Walker et al. |
| 6,442,532 | B1 | | 8/2002 | Kawan |
| 6,595,417 | B2 | * | 7/2003 | O'Hagan et al. ........... 235/383 |
| 6,640,214 | B1 | * | 10/2003 | Nambudiri et al. ........... 705/26 |

FOREIGN PATENT DOCUMENTS

| JP | 41105364 | 2/1999 |
| JP | 2001-175751 | 4/2001 |
| JP | 2001-134684 | 5/2001 |
| JP | 2001-217826 | 8/2001 |

* cited by examiner

Primary Examiner—Daniel Stcyr
(74) Attorney, Agent, or Firm—Townsend and Townsend and Crew LLP

(57) ABSTRACT

The present invention enables secure, valid card payments in credit transactions to be performed, preventing fraudulent card use even in cases of loss or theft of a card or of information theft. During a transaction authorization process using a transaction terminal disposed in a credit transaction member store and connected with a host computer, user validation or credit administration is carried out by using a portable communication terminal to input to the host computer identity information which has been previously registered in the portable communication terminal and/or location information for the portable communication terminal.

5 Claims, 7 Drawing Sheets

| CARD NO. | 0123-4567-8901 | 0123-4567-8901 |
|---|---|---|
| NAME (IN ALPHABET) | TARO YAMADA | HANAKO SUZUKI |
| NAME | 山田　太郎 | 鈴木　花子 |
| GOOD THROUGH (YEAR/MONTH) | 2002/4 | 2002/5 |
| REPORT OF THEFT OR LOSS | No | No |
| PIN | 3341 | 4649 |
| DESIGNATION OF USER VALIDATION METHOD | FULL-TIME | OCCASIONAL SELECTION |
| BIRTHDAY | 1968.12.23 | 1973.5.20 |
| ADDRESS | Tokyo-to, Bunkyo-ku,··· | Kanagawa-ken, Yokohama-shi,··· |
| PHONE No. (HOME) | 03-3456-7980 | 045-876-5432 |
| PHONE No. (CELL PHONE) | 090-890-1818 | 090-794-0679 |
| RESPONSE TO LOCATIONAL DATA OF CELL PHONE | RESPONDING | NOT RESPONDING |
| LIMIT OF AMOUNT PER MONTH | ¥500,000 | ¥300,000 |
| AMOUNT PAID BY CARD (THIS MONTH) | ¥150,000 | ¥0 |
| No. OF TIMES CARD USED (THIS MONTH) | 5 | 0 |
| No. OF TRANSACTIONS BY CELL PHONE (THIS MONTH) | 3 | 0 |
| TOTAL POINTS | 155 (=150/1000+3) | 0 |

FIG.8

METHOD AND SYSTEM TO PREVENT FRAUDULENT PAYMENT IN CREDIT/DEBIT CARD TRANSACTIONS, AND TERMINALS THEREFOR

CROSS-REFERENCES TO RELATED APPLICATIONS

This application is a continuation of Ser. No. 10/001,062, filed Oct. 31, 2001, now U.S. Pat. No. 6,612,488.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

1. Field of the Invention

The present invention relates to technology for preventing fraud in credit/debit card payment systems.

2. Description of the Related Art

Previously, measures for preventing fraudulent use of credit cards in card transaction payment systems have included two methods: a credit check for the card used and cardholder validation.

Credit involves recognizing the validity of the card, for example, whether the credit card has been stolen or whether the credit limit has been exceeded. This procedure is usually carried out by sending card information, such as the credit card number, from a card transaction terminal located in the member store to a transaction authorization computer, which is a host computer at the credit card company, a merchant bank computer, or the like, referencing card information stored in a database within the transaction authorization computer, confirming the available credit line, etc., and determining whether the card can be used. When a credit card holder wants to use a credit card to pay for goods or services at a credit card member store (hereinafter "member store"), a credit check for the card is first carried out at the member store. Normally, a credit check proceeds by sending card information, such as the card number and expiration date, through a credit card transaction terminal (hereinafter "transaction terminal") located in the member store to a settlement payment computer and requesting the credit check. When the transaction authorization computer receives the credit check request, the transaction authorization computer references the database to find out whether the pertinent credit card has been made unusable by being reported lost or stolen, and whether the credit limit for the card will be exceeded by the current transaction. The information regarding whether payment with the pertinent credit/debit card is allowed, based on the results of the check, is sent to the aforementioned card transaction terminal at the member store. Card information stored in the database includes, for example, the cardholder address, telephone number, birth date, registered PIN (Personal Identification Number), the credit limit, and the number of credit card transactions permitted within a specified period. When the transaction authorization computer reports the results of the credit check to the card transaction terminal at the member store, a transaction authorization code is issued. When the results of the credit check permit credit card payment, a credit card sales receipt, whereon the transaction authorization code is recorded, is issued by the card transaction terminal at the member store, and the card user validation process is performed.

The user validation process involves comparing the customer signature receipt with the signature previously inscribed on the credit card, by comparing the face of the card user with a photograph on the card for cards having photographs, or by checking the PIN input by the card user to the card transaction terminal against the PIN previously stored in the database of the transaction authorization computer. Measures for preventing fraudulent card usage in the conventional art include recording the loss of a card in the transaction authorization computer database when the cardholder loses his or her card, and performing a credit check with the transaction authorization computer every time the card is used to prevent fraudulent use by a person who found the card. In addition, performing a user validation procedure, such as PIN input every time the card is used for payment, makes it possible to deal with a situation where there is no information to prevent the use of a lost card.

In the above prior art, when a card is lost or stolen, the card user quickly contacts the credit company and adds "usage not allowed" to the card information in the database. As a result, when a third party tries to use the card, "usage not allowed" is determined in the credit check and can make it impossible to use that card. However, with the broad dissemination of various types of cards, such as credit cards, it is often the case that a single user has a plurality of cards and may not be immediately aware of the fact that a card is lost or stolen. Furthermore, all the cards possessed by a user may not carried, and it is often the case that discovery of the loss or theft of a card is delayed.

For most current credit cards, information such as the card number, card expiration date, user name, and so forth is printed on the surface of the credit card and is recorded on the magnetic tape affixed to the card. These credit cards and transaction authorization systems have the disadvantage that card information necessary for recognizing the card number, expiration date, cardholder, and cardholder signature is easily stolen from the card or terminal. Consequently, the cardholders and credit card companies face considerable liabilities because of card forgery or theft. For example, the method of recognizing a user by comparing the PIN input by the user to the PIN stored in the transaction authorization computer is a secure user validation method because, in theory, the PIN is information known only by the bona fide user of the credit card. However, cases have occurred wherein PINs have been stolen by modifying the card transaction terminal established in the member store and stealing and recording the PIN r input by a user when the card information is acquired. Thus, user validation technology using a PIN is not necessarily effective in preventing the illicit use of stolen or forged cards. The debit card payment system, a shopping service using cash transfer cards, has the same types of problems as the aforementioned credit cards with regard to security against the leakage of card information.

Related materials include the Japanese Patent Laid-open Nos. 2001-21789, 2001-175751, and 2001-134684.

Japanese Patent Laid-open No. 2001-21789 relates to encrypting a password or the like and inputting the password from the user terminal directly to a verification center in order to ensure security in transactions on the Internet.

Japanese Patent Laid-open No. 2001-175751 relates to a dedicated terminal comprising a card reader used by a user in order to improve the security in credit processing for credit card payments in on-line shopping. Japanese Patent Laid-open Nos. 2001-21789 and 2001-175751 both relate to security in the payment of virtual transactions concluded by credit card and do not relate to security for credit card transactions concluded in an actual store. Japanese Patent Laid-open No. 2001-134684 makes it possible to use a cellular phone to purchase items from an automatic vending machine by specifying the user with the cellular phone user ID and having a credit card company provide payment. Japanese Patent Laid-open No. 2001-134684 is also not related to security for credit card transactions in an actual store.

BRIEF SUMMARY OF THE INVENTION

In view of the problems with the prior art discussed above, issues to be resolved by the present invention include (1) preventing transaction authorization when the credit card is lost or stolen or when it appears that the card ID information has been copied, and (2) eliminating the danger that information necessary for user validation, such as the PIN, can be stolen during the payment process.

The present invention provides a method, system, and terminals for credit card and debit card transactions, that can resolve these problems.

The method of the present invention for providing secure, bona fide credit/debit transactions, using a card transaction terminal in a credit/debit card member store, includes the steps of: storing information for recognizing a credit card user in a database capable of being accessed by a host computer to which said card transaction terminal is connectable; sending information relating to said credit transaction payment from said card transaction terminal to a portable communication terminal containing information relating to the identity of said credit card user registered therein; inputting said identity information and said information relating to said credit transaction payment to said host computer through said portable communication terminal; and verifying said credit card user as the authentic cardholder on the basis of said validation and identification information.

Moreover, the present invention provides a method of authorizing credit/debit card transactions, using a card transaction terminal in a credit card member store, comprising the steps of: storing location information of said card transaction terminal in a database capable of being accessed by a host computer to which said card transaction terminal is connectable; sending information relating to said credit transaction payment from said card transaction terminal to a portable communication terminal containing information relating to the identity of said credit card user; inputting information relating to the current location of said portable communication terminal to said host computer; and recognizing said credit card user as the authentic cardholder when said location of said portable communication terminal is within a predetermined range from of said card transaction terminal.

Furthermore, the present invention provides a method of authorizing credit/debit card transactions, using a card transaction terminal in a credit card member store, comprising the steps of: storing information for recognizing a credit card user and the location information of said card transaction terminal in a database capable of being accessed by a host computer to which said card transaction terminal is connectable; sending information relating to said credit transaction payment from said card transaction terminal to a portable communication terminal containing information relating to the identity of said credit card user; inputting said identity information and information relating to payment of said credit transaction to said host computer through said portable communication terminal; and recognizing said credit card user as the authentic cardholder on the basis of said validation and information; inputting information relating to the current location of said portable communication terminal to said host computer; and authorizing said credit card payment when the location of said portable communication terminal is within a predetermined range of the location of said card transaction terminal.

The system of the present invention, as pertains to credit and debit card transactions taking place at a transaction terminal located in a credit card/debit card member store comprises: a host computer capable of communicating with said card transaction terminal and capable of carrying out transaction validation processing on the basis of information sent from said card transaction terminal; wherein said host computer is capable of accessing a database storing information for validating a credit card user; and said host computer identifies said credit card user as an authentic cardholder on the basis of information for recognizing said credit card user and identity information, when information relating to identity of said credit card user and said information relating to said credit transaction validation are inputted from a portable communication terminal having said identity information registered therein.

Also, the present invention provides a transaction authorization system in credit transactions, for carrying out payment by credit/debit card using a card transaction terminal in a credit card member store, comprising a host computer being capable of communicating with said card transaction terminal and carrying out said settlement process based on information sent from said card transaction terminal; wherein said host computer is able to access a database to which location information for said card transaction terminal is registered in advance; and said host computer identifies said credit card user as an authentic cardholder on the basis of said location information of said portable communication terminal and the location information of said card transaction terminal, when information relating to identity of the credit card user and said information relating to the credit transaction settlement are inputted from said portable communication terminal, to which said identity information is registered in advance.

Moreover, the present invention provides a portable communication terminal device capable of being used for credit card authorization, including: a wireless communication component for sending and receiving wireless signals for transmitting information through a public communication network; a main controller connected to this wireless communication component; a key input component for inputting data and connected to said main controller; a display screen connected to said main controller; a memory, for storing information relating to said credit card therein and connected to said main controller; and a card transaction terminal communication component connected to said main controller; wherein said card transaction terminal communication component is configured to be able to receive information relating to the settlement from the card transaction terminal in the credit card member store; and said main controller is constituted to be able to control the sending of the information for verifying that said credit card user is the bona fide cardholder, along with said information relating to the transaction, through said wireless communication component.

As the invention of a card transaction terminal that can resolve these problems, the present invention provides a card transaction terminal for carrying out credit transaction settlements at a credit card member store and includes: a card reader for reading credit card information; a main controller connected with said card reader; a first communication component, connected with said main controller, for communicating with a host computer; a second communication component, connected with said main controller, for establishing a wireless connection with a portable terminal device in which the cardholder's identity information is stored; wherein said controller is able to send the credit card information read by said card reader to said host computer and receive the code for specifying the authorization for the transaction from said host computer through said first communication component, and to send said code thus received through said second communication component.

In addition, the present invention provides a card transaction terminal for carrying out credit/debit card transactions at a credit card member store which includes: a terminal control with which data input operations are performed; a main controller connected with said terminal control; a first communication component, connected with said main controller, for communicating with a host computer; a second communication component, connected with said main controller, for establishing a wireless connection with a portable terminal device in which the cardholder's identity information is stored; wherein said controller is able to send, to said cellular phone, transaction price data corresponding to the product information input from said terminal control and a code for specifying the member store where the card transaction terminal is located, and to receive, from said cellular phone, a code specifying authorization of the transaction and a code specifying transaction completion, both codes transmitted through said second communication component, and is further able to send said code specifying transaction completion from said first communication component to said host computer.

The present invention makes it possible to prevent the fraudulent use of cards or the like, even when the card has been lost or stolen or card information or the like has been revealed, and can improve security in the settlement of credit transactions.

DESCRIPTION OF THE PREFERRED EMBODIMENTS

The embodiments of the present invention are explained below with reference to FIGS. 1 through 8.

In the present invention, the credit card user uses a portable communication terminal registered in advance to the host computer of a credit card company or other similar company providing this service, and for implementation of the credit administration process and the user validation process.

The first embodiment of the invention is explained with reference to FIGS. 1 through 6. The credit card transaction system relating to the present embodiment is explained using FIG. 1. A transaction terminal for credit and debit card transactions (hereinafter "transaction terminal") 300 is established in a credit card/debit card member store (hereinafter "member store") 3000. (Below, when reference is made to a credit card or credit card company, it will be understood such reference includes debit cards, and other similar cards.) This transaction terminal 300 is connected to a host computer/transaction authorization computer 400 of the a credit card company through a general public network 500 such as a subscriber telephone network or an ISDN network. Credit card 200 is a credit card used by the credit card holder in order to pay for the purchase of products or the fees for services received at member store 3000. Moreover, cellular phone 100 is a portable communication terminal owned by the credit card holder and is able to connect to the host computer/transaction authorization computer 400 of the credit card company through wireless network 600. The ID number or the like for cellular phone 100 is stored in the host computer of the credit company in advance. Credit card 200 is the credit card for which such information as the card number, cardholder name, and expiration date resides in the credit company computer. Transaction terminal 300 located in the member store 3000 is a credit card transaction device. The card transaction terminal sends the card information for credit card 200 through network 500 to the host computer/transaction authorization computer 400 of the credit card company, requests credit administration, and issues a bill in a case where the result of credit administration is that settlement is possible. Host computer/transaction authorization computer 400 has in its database credit card information and private information for the cardholder, the card history, and member store information such as the member store number, store name, and store location. When a request for credit administration is received, the host computer searches for the credit information corresponding to the card information and the amount of the purchase, and determines whether the card can be used. The wireless network 600 performs the switching between cellular phone 100 and general network 500.

Figure 1:
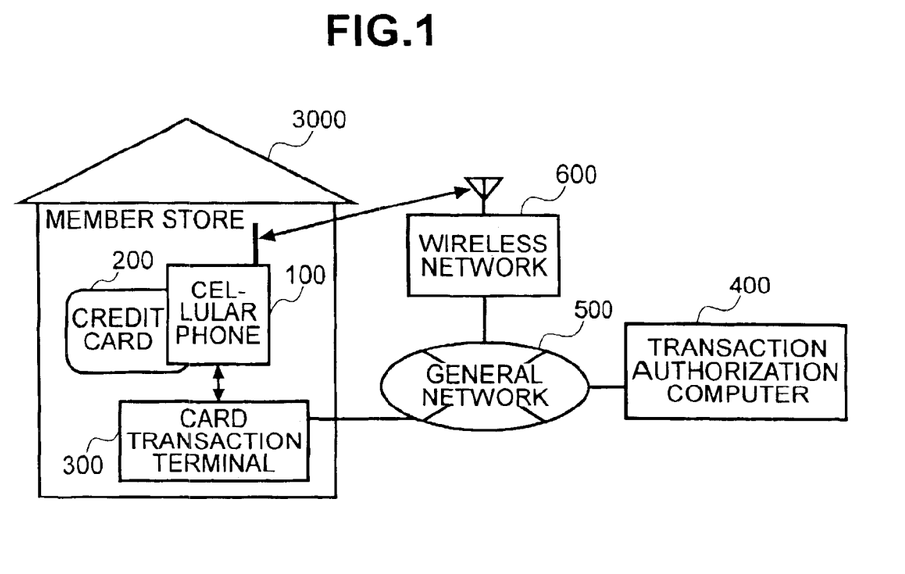
FIG. 1 shows a payment system relating to the first embodiment of the present invention.
Figure 2:
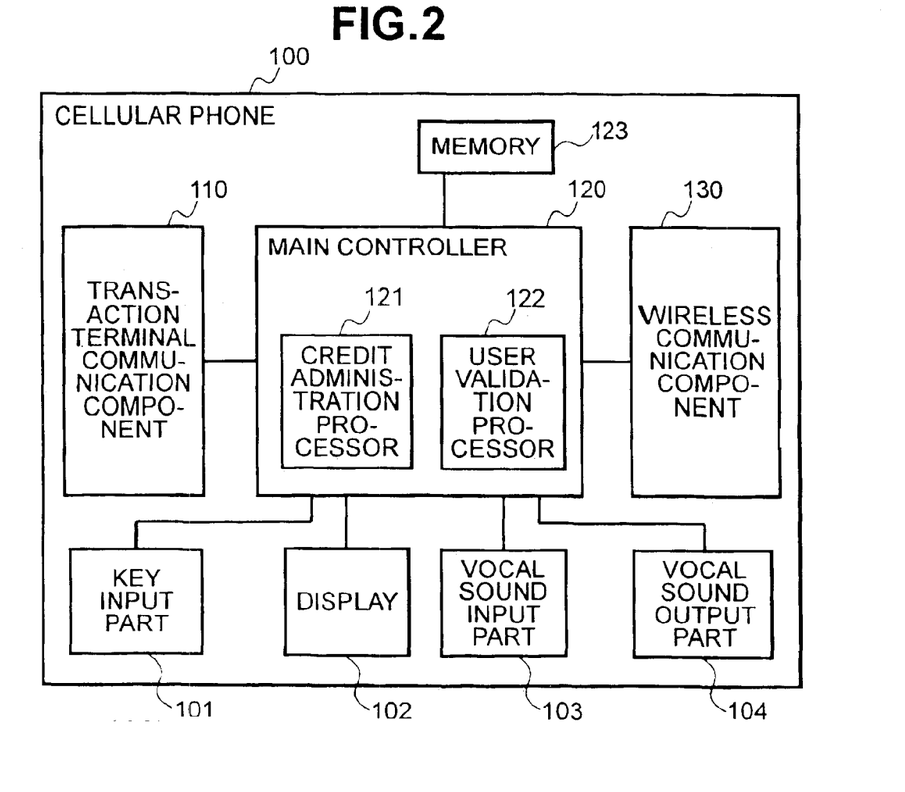
FIG. 2 is a block diagram of the configuration of the cellular phone relating to the first embodiment of the present invention.

The configuration of cellular phone 100 is explained with reference to FIG. 2. Cellular phone 100 comprises a transaction terminal communication component 110, a wireless communication component 130, a key input 101, a display 102, a vocal sound input 103, a vocal sound output 104, and a memory 123, each connected to main controller 120. Main controller 120 comprises a central processing unit (CPU) (not shown), as well as a credit administration processor 121 and a user validation processor 122. Transaction terminal communication component 110 is a circuit providing an interface for information exchange between cellular phone 100 and transaction terminal 300, which is located in member store 3000. In the present embodiment, communication between cellular phone 100 and transaction terminal 300 uses a wireless connection using a different frequency from the frequency band used by cellular phones. This wireless connection is used in wireless LANs, such as Bluetooth (trademark of Ericsson Inc.), using the 2.4 GHz frequency band, for example. The communication system between cellular phone 100 and transaction terminal 300 may also employ a method of information exchange through a wireless communication system, using infrared instead of radio waves, or through a wired connection. Wireless communication component 130 is a circuit for sending and receiving wireless signals for information exchange between cellular phone 100 and wireless network 600, and makes it possible to connect the cellular phone with credit transaction authorization computer 400 or with the Internet.

Main controller 120 includes credit administration processor 121 for sending card information such as the card number and expiration date to credit transaction authorization/host computer 400 and implementing the credit administration process; and user validation processor 122 for sending the PIN input by the credit card user using cellular phone 100 to settlement computer 400 of the credit card company and for carrying out the user validation process. The main controller also controls all cellular telephone functions including voice communications and Internet connections. The dialing operations and memory dialing operations when the cellular phone 100 is used as a voice phone, Internet information retrieval operations, and the PIN input operation during user validation are performed using the key input 101. PIN input may also be carried out through voice recognition, but is performed through key input in the present embodiment. Furthermore, the status of cellular phone operations, such as the progress of credit processing using cellular phone 100, is displayed on display 102.

Figure 3:
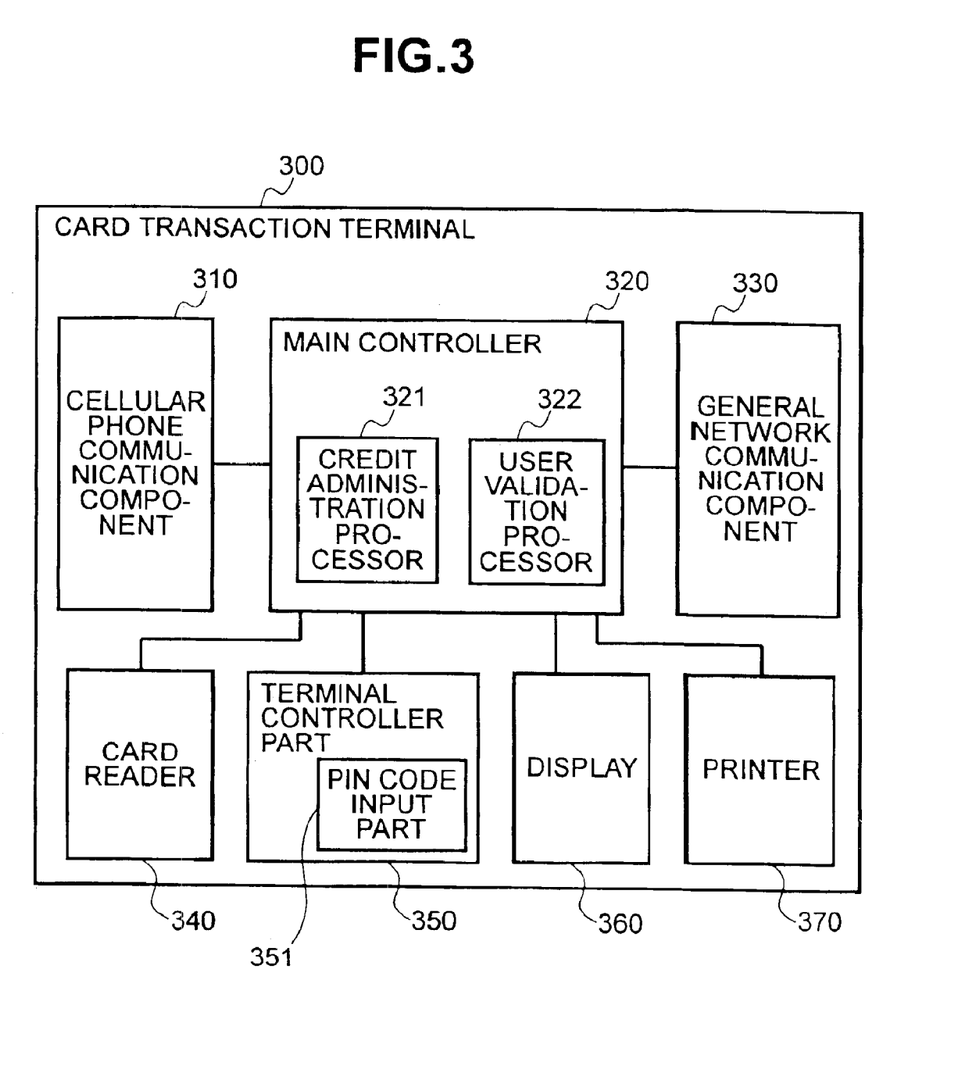
FIG. 3 is a block diagram of the configuration of the card transaction terminal relating to the first embodiment of the present invention.

Transaction terminal 300 in the member store is explained with reference to FIG. 3. Cellular phone communication component 310, which is a second communication component, general network communication component 330, which is a first communication component, card reader 340, terminal control 350, display 360, and printer 370 are each connected to main controller 320. Main controller 320 comprises a central processing unit (CPU)(not shown), as well as a credit administration processor 321 and a user validation processor 322. Credit administration processor 321 and user validation processor 322 are not necessarily circuits or devices independent of the CPU and may also be part of the functions of the CPU. Cellular phone communication component 310 carries out information transfer between cellular phone 100 and transaction terminal 300. Main controller 320 carries out centralized administration of all controls for transaction terminal 300, while executing the credit administration process with settlement computer 400 according to the credit administration processor 321, or the user validation process with the settlement computer 400 according to the user validation processor 322. General network communication component 330 connects to the general network to effect information transfer between card transaction terminal 300 and settlement computer 400. Card reader 340 reads the information bout the credit card from a magnetic stripe or a memory chip embedded in the card. Terminal control 350 is an operation input device for running transaction terminal 300; input keys or a touch panel are used. When user validation is performed through transaction terminal 300, the PIN is input to PIN code input 351 located in terminal control 350. Display 360 is a device for showing the settlement amount of the account or settlement process status; a liquid crystal display device is used in the present embodiment. When bills or receipts are issued, printer 370 prints the transaction bill and receipt according to the instructions from main controller 320.

Figure 4:
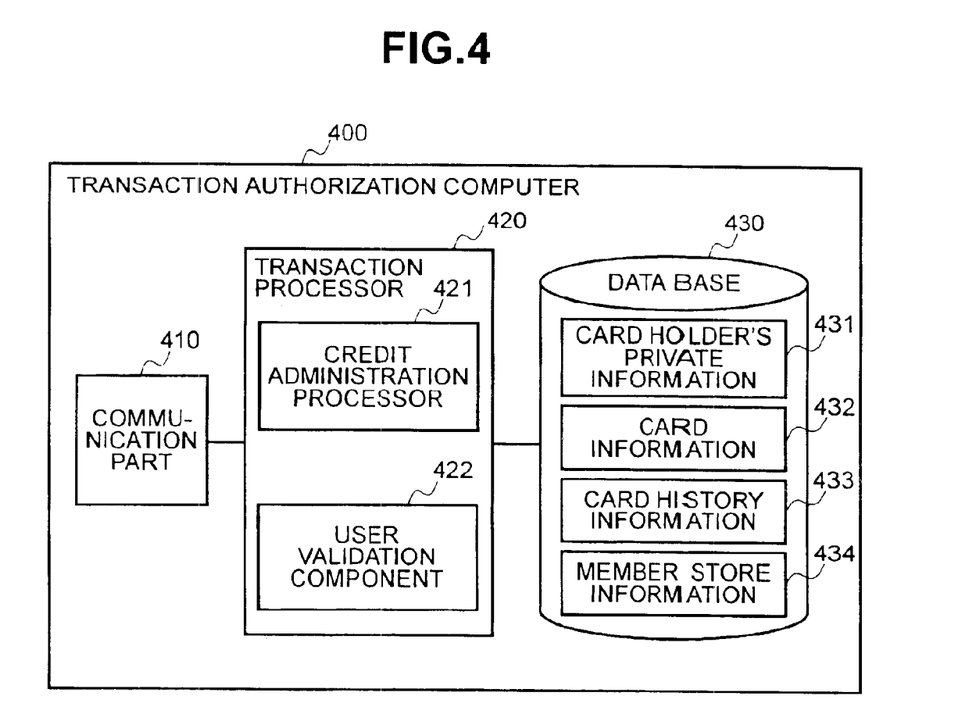
FIG. 4 is a block diagram of the configuration of the host computer relating to the first embodiment of the present invention.

The configuration of settlement computer 400 is explained with reference to FIG. 4. Credit settlement computer 400 comprises a communication component 410, a settlement processor 420 connected to communication component 410, and a database 430 connected to settlement processor 420. Settlement processor 420 comprises a credit administration processor 421 and user validation processor 422. The cardholder's private information 431, card information 432, card history information 433, and the member store information 434 are stored in the database 430. Information, such as the name, address, telephone number, birth date, and employer of each user who is a valid credit card holder, is stored as the cardholder's private information 431. Information such as the card number, card expiration date, and PIN is stored as the card information 432. Information such as the name, purchase date, and purchase location of products purchased using the credit card is stored as the card history information 433, and information such as the member store address and telephone number is stored as the member store information 434. Communication component 410 exchanges information exchange with cellular phone 100 and allows information exchange with cellular phone 100 through a general phone line or the Internet. In settlement processor 420, the credit administration process is carried out by credit administration processor 421 on the basis of card information received from communication component 410 and information in database 430; and the user validation process is carried out by comparing the PIN data with the PIN information stored in the database by user validation processor 422. Credit settlement computer 400 is able to search information, such as calling the aforementioned private cardholder information 431 for the name of the cardholder using the card number, or referencing prior card history information 433. Settlement processing means 421 is used to reference information from this database and to determine whether settlement is possible. The PIN is checked at the time of the credit administration process with credit administration processor 421 and user validation processor 422. Settlement processor 420 references the database and carries out credit administration using the card information received through the aforementioned communication component 410, and, when the card is deemed usable, issues a settlement authorization number and sends that number to the transaction device of member store 3000. When the user validation process is carried out in member store 3000 using a validation method such as checking the signature, a bill including the settlement authorization number is printed by printer 370 and the card user is asked to sign this bill.

Figure 5:
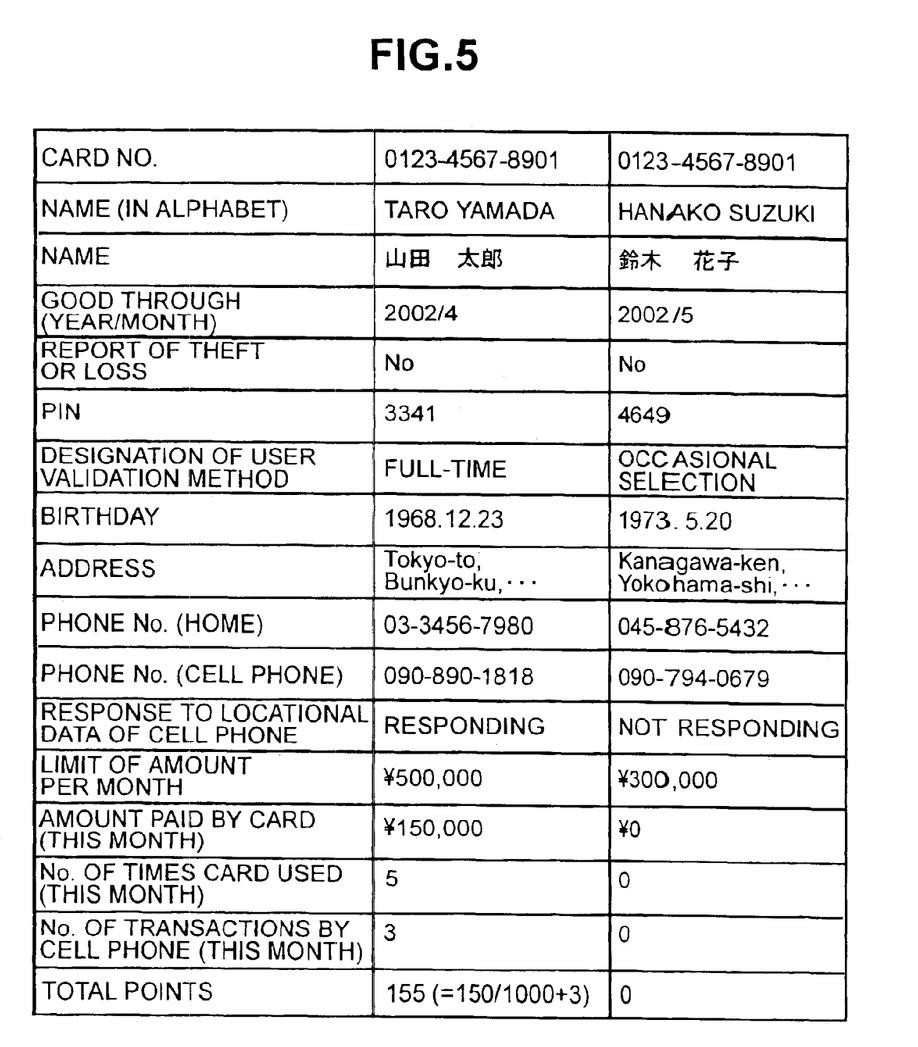
FIG. 5 shows an example of the information stored in the database relating to the first embodiment of the present invention.

FIG. 5 shows an example of the types of information stored in the database used for information reference during the credit administration process and user validation processor by the settlement computer.

In FIG. 5, the card number, the cardholder name in Roman letters, cardholder name in other characters, card expiration date (year/month), report of loss or theft, PIN, and designation of user validation method correspond to the card information 432. The birth date, address, home telephone number, and cellular phone number correspond to the cardholder's private information 431; and the credit or expenditure limit per month, the amount paid or purchased by card (this month), the number of times the card has been used (this month), number of transactions by cell phone (this month), and the total points for the card, correspond to card history information 433.

Figure 6:
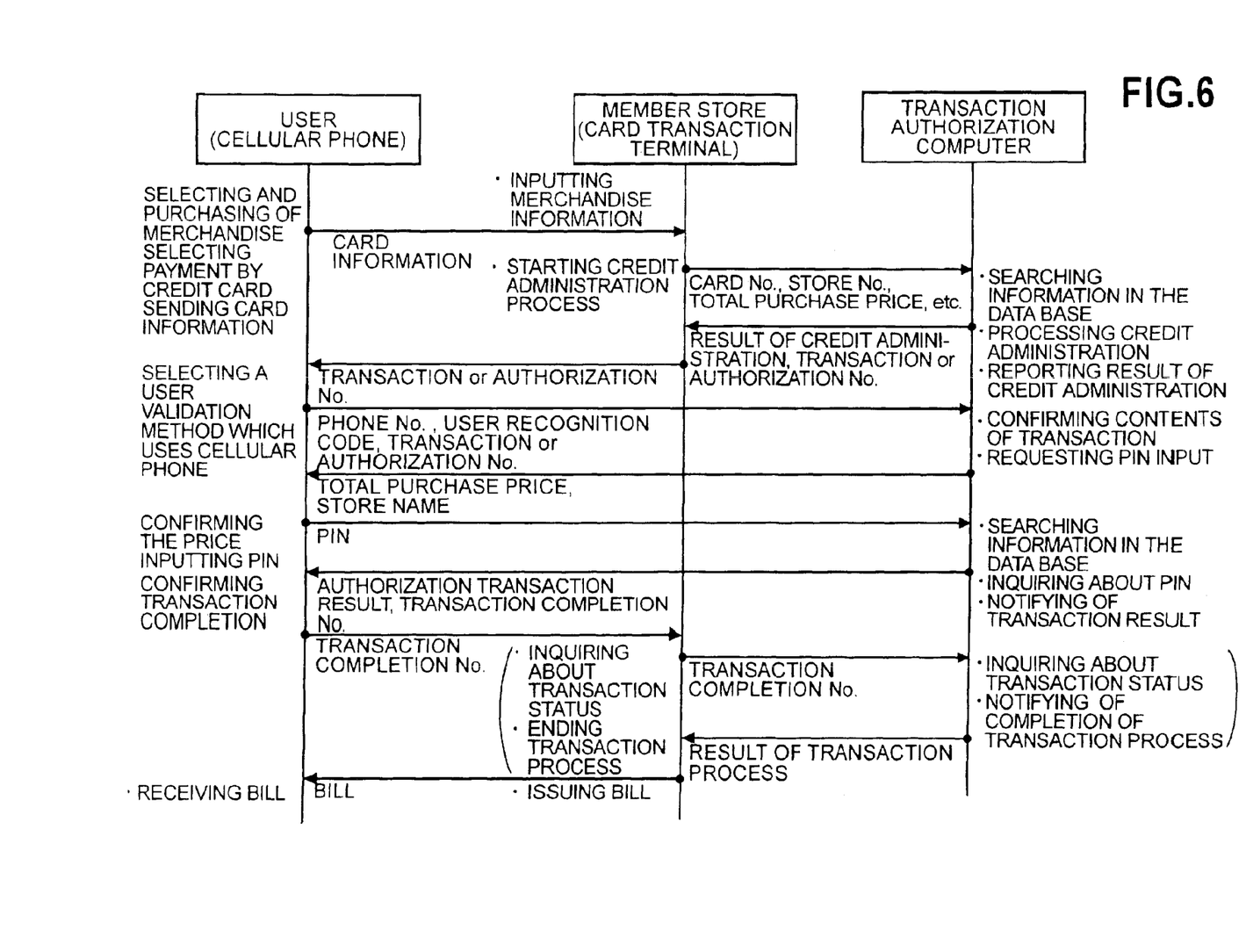
FIG. 6 illustrates the user validation process flow according to the first embodiment of the present invention.

FIG. 6 shows an example of the payment process procedures in the credit card transaction system. Cellular phone 100 of he present invention is able to store information for the credit card 200 and is able to exchange card information data or the like through wireless transfer to transaction terminal 300 by using transaction terminal communication component 110. The transaction terminal 300 also contains a cellular phone communication component 310 that can exchange data with the cellular phone through wireless transfer. At the time of purchase payment for a customer in member store 3000, the total purchase price or the prices of the individual items/services for items purchased by the customer is input to the transaction terminal 300. When the customer is a credit cardholder (user) and requests to use the card for payment, the customer uses cellular phone 100 for wireless transmission of the card information to transaction terminal 300 in member store 3000. Information processing during transmission of card information can be simply carried out without requiring a wired connection between the cellular phone 100 and transaction terminal 300. When cellular phone 100 is used only as an input device for user validation, without credit card information stored in the cellular phone, the card information can be transferred to transaction terminal 300 by reading the credit card 200 with the card reader in the card transaction terminal 300 at the member store. Next, transaction terminal 300 transfers the card number information and purchase amount information to the transaction authorization computer 400, and requests credit administration. Under the control of credit administration processor 321 of main controller 320 of card transaction terminal 300, the command requesting credit administration is transferred to the credit administration processor of transaction processor 420 through general network communication component 330, general network 500, and communication component 410 of transaction authorization computer 400. Using credit administration processor 421, transaction authorization computer 400 searches database 430 for the received card information and purchase amount information, searches for information regarding a hold on the credit card and for the pertinent credit card information necessary for credit administration, checks for a report of loss or theft, and carries out the margin recognition process for the usable balance in the card information. When credit administration is successful, transaction processor 420 reports the successful credit administration, and, at the same, time issues a transaction authorization number, which is a credit administration result recognition number also used in payment processing on the bill. The credit administration results and transaction authorization number are transmitted to main controller 320 of transaction terminal 300 through communication component 410 of transaction authorization computer 400, general network 500, and the general network communication component of the transaction terminal 300 in credit member store 3000. Furthermore, in the present embodiment, the user validation method may be selected from among a method for checking the recorded PIN with PIN input through cellular phone 100, a method for checking the recorded PIN with PIN input at the member store, or a method for checking the signature of the cardholder. In other words, when the item "designation of user validation method" in the card information for the credit card is saved as "full-time", user validation by PIN input from the cellular phone is carried out every time. When the item "designation of user validation method" is saved as "occasional selection", the card user is able to select the user validation method at the time of payment. This "occasional selection" makes it possible to use different user validation methods in different situations. For example, cardholders shopping at stores they often patronize, select the user validation method using PIN checking from the member store settlement terminal. But when a cardholder enters an unfamiliar store name for the first time, the cardholder selects the user validation method using PIN checking through the cellular phone.

The procedures for the user validation process using PIN checking with the cellular phone are as follows. The credit card user receives the transaction number, received from the transaction terminal at the time of credit administration, through cellular phone communication component 310 of transaction terminal 300, and transaction terminal communication component 110 of cellular phone 100. Main controller 120 of cellular phone 100 opens transmission to the credit settlement or authorization computer, once the user has implemented the user validation operation after receiving the transaction number, and establishes communication. When the main controller of the cellular phone reports the transaction number to the transaction authorization computer 400, the transaction authorization computer references database 430 and communicates the member store name and purchase amount corresponding to the transaction number. In the present embodiment, the transaction information is converted to a voice signal by the voice signal converter in transaction processor 420 of transaction authorization computer and is sent to cellular phone 100 through public network 500 and wireless network 600. After the card user confirms the transaction information output from the vocal sound output of cellular phone 100, the card user inputs the PIN through key input 101 of the cellular phone during the interval when transaction authorization computer 400 is waiting for PIN input. The PIN input from key input 101 is converted to a DTMF (Dual Tone Multiple Frequency) tone signal and is sent to transaction authorization computer 400. In transaction processor 420 of computer 400, the PIN input by the card user using cellular phone 100 is distinguished from the DTMF tone signal received from cellular phone 100 and is checked against the PIN registered in advance and stored as card information 432 in database 430. Thus, the card user is identified as the bona fide cardholder. To increase security during transmission of the PIN, an encryption device may be provided in cellular phone 100 and a decryption device, in computer 400. When the PIN check is successful, a process completion number is issued by user validation processor 122 in main controller 420 of transaction authorization computer 400 and is sent to cellular phone 100. In the main controller of cellular phone 100, processing by user validation processor 122 is also terminated with receipt of this number. Finally, the transaction completion number received from transaction authorization computer 400 is reported to transaction terminal 300 and the card user's transaction is complete. Afterward, when the user must decide whether to store this transaction information and chooses to do so, transaction information pertaining to the card, such as the credit card member store name, amount paid by card, settlement number, and settlement completion number can also be stored. On the other hand, upon receiving this transaction authorization number from cellular phone 100, the transaction terminal 300 of member store 3000 executes a process to immediately check the number with the transaction authorization computer 400. Upon completion of the number verification, the card user ends the user validation process and acknowledges the completion of the transaction process. After that, the transaction terminal 300 issues a receipt for the purchase and ends the credit transaction process.

As discussed above, the danger of revealing the PIN, which is important card information, is reduced because the credit card user can input the PIN with his or her own cellular phone without going through the transaction terminal located at the member store.

To increase security, user validation through a PIN checking process using a cellular phone 100, may also be performed as follows. The notification from cellular phone 100 is set up to be transmitted with a notification of the phone number. User validation processor 422 of transaction processor 420 of the transaction authorization computer 400 recognizes the sender number notification in the notification sent from the cellular phone and received by communication component 410, and will not accept the transmission if the notification is sent from the cellular phone having the cellular phone number stored in database 430. Furthermore, in user validation processor 422, the transaction authorization number received with the DTMF tone signal is also a determining parameter and the process advances to the subsequent PIN checking process only when the following conditions match: the card information corresponding to the transaction authorization number, the stored cellular phone number corresponding to the card information, and the number in the sender phone number notification received by communication component 410. Increased security can thus be effected.

Figure 7:
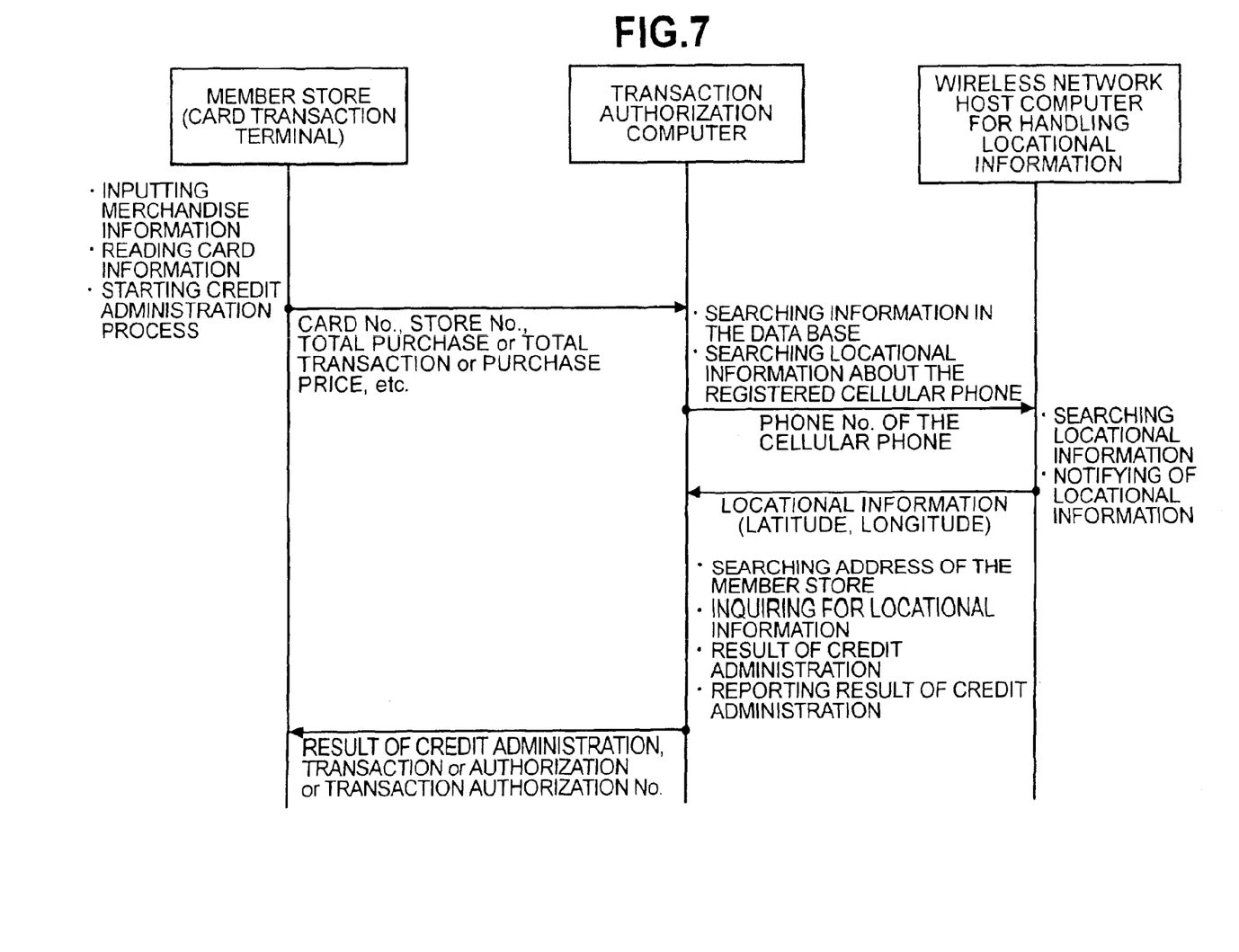
FIG. 7 illustrates the process flow for the user validation process according to the second embodiment of the present invention.

The second embodiment of the present invention is explained with reference FIG. 7. This embodiment exemplifies a case where cellular phone 100 registered in the card transaction system has a location information detection function. The present embodiment differs from the first embodiment in that the cellular phone has a location information detection function. The configuration of transaction terminal 300 and transaction authorization computer 400 are the same as in the first embodiment. In the present embodiment, the cellular phone system, including wireless network 600, provides a location information detection service. Wireless network 600 comprises a location information host computer for detecting the location of cellular phone 100. Location detection uses, for example, a method of finding the current location from the relative positions of cellular phone 100 and three base stations, such as are used in PHS (Personal Handyphone System), or a method of finding the current location with a GPS (Global Positioning Satellite) system using artificial satellites. In the present embodiment, the base stations specify the cellular telephone with the pre-registered telephone number and provide notification of the current location information of the cellular phone as latitude and longitude information through the communication network.

The process flow of a credit administration system using location information for a cellular telephone, and having a location information detection function, is explained with reference to FIG. 7. Upon receiving a request for credit administration from the member store transaction terminal 300, the transaction processor 420 of the transaction authorization computer searches the database with the card number, checks for a "report of loss or theft", and compares the transaction amount with the amount available for purchases calculated by subtracting the "amount paid by card (this month)" from the credit or purchase limit per month." Next, a credit administration process using the location information function is carried out. In this process, the item "response to location data of cellular phone," in the stored card information, is initially recognized. When a "not responding" message results, a determination of whether the card is usable is returned to the transaction terminal located in the member store as the credit administration result for the credit administration request process because the location information for the cellular phone cannot be detected. If the result is a "responding" message, credit administration can be carried out with location information and transaction processor 420 sends a location information detection request to the location information host in wireless network 600, with the parameter being the "cellular phone number" stored by the card user.

The location information host computer detects the current location information for the cellular phone in response to the detection request from transaction authorization computer 400. When the current location of the cellular phone can be specified as a result of the detection, the location information is converted to latitude and longitude information and sent to transaction authorization computer 400. When a current location cannot be specified, a notification of detection failure is sent to computer 400. Transaction authorization computer 400 receives the results of the cellular phone location information detection, and, when the location information could be successfully acquired, the computer searches the member store information, stored in the database based on the member store number, for the location information in latitude and longitude format for the member store. Transaction authorization computer 400 then compares this information with the current location information for the cellular phone and calculates the distance. In the present embodiment, if the distance between these locations is within 10 m, for example, it is determined that the person carrying the registered cellular phone is at member store 3000 and that the credit card user is a valid user. If the distance is greater than 10 m, it is determined that this is fraudulent use of the card. Transaction terminal 300 is notified of these results. The distance between the locations is not limited to 10 m and may also be set to 15 m or 20 m for large-scale establishments. In addition, when card usage is authorized as result of this determination, the transaction authorization number may be sent to transaction terminal 300 at the same time as the notification. When the results of the credit administration request are that "card use is allowed", transaction terminal 300 continues with the transaction processes, such as the issuing of the bill, using the received transaction authorization number and the user validation process. On the other hand, when it is determined that "card use is not allowed," that information is displayed on a display device of transaction terminal 300 and the transaction process is interrupted. In this way, credit administration is carried out such that the location information for the cellular phone is used as the current location of the valid card user and is compared with the location information at the member store. If the difference between the location information is within a set value, it is determined that this card is being used by a valid cardholder; and if the difference between the location information is greater than a certain distance, it is determined that use of the card is fraudulent. Fraudulent use of the card through the loss or theft of the card or through the theft of card information can thereby be prevented.

Figure 8:
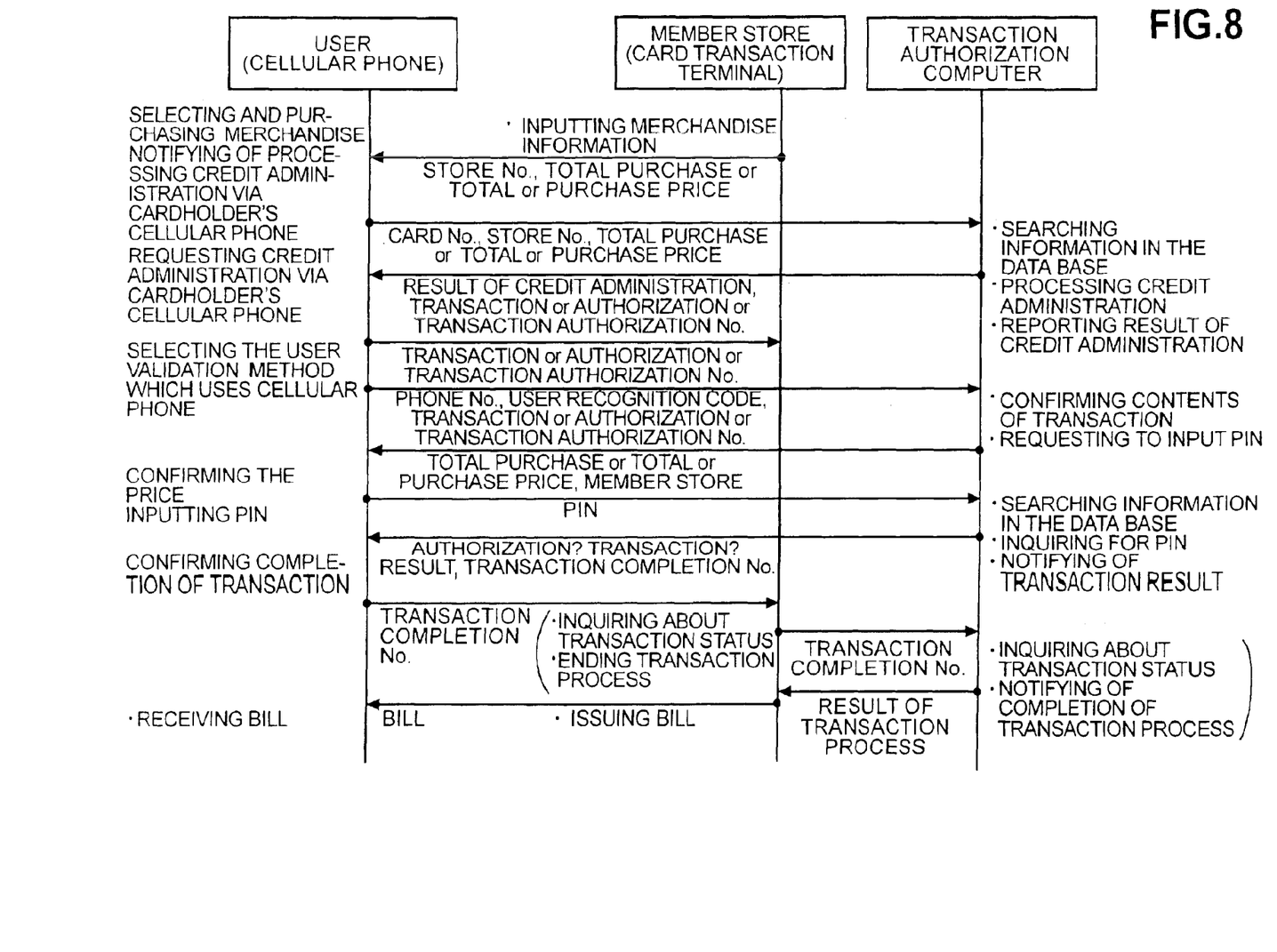
FIG. 8 illustrates the process flow for the credit administration process according to the third embodiment of the present invention.

The third embodiment of the present invention is explained with reference to FIG. 8. This embodiment exemplifies the sending and receiving of data to and from transaction authorization computer 400 through cellular phone 100. In the transaction process of the present invention, credit administration and user validation are carried out through cellular phone 100. Moreover, the configuration of the hardware is the same as in the first embodiment. In FIG. 8, the card user, when purchasing a product, asks member store 3000 to use its credit card payment procedure and to use a cellular phone for the credit card credit administration process. In member store 3000, member store information, such as the member store number necessary for card authorization, and transaction information, necessary for credit administration such as the transaction amount, are sent to cellular phone 100 using cellular phone communication component 310 of transaction terminal 300 in the member store. Credit administration processor 121 of main processor 120 of the cellular phone adds card information, such as the card number, to the transaction information, such as the member store number and transaction amount received, and sends this information for use in requesting credit administration through wireless communication component 130 to the transaction processor of transaction authorization computer 400. When this request received, computer 400 searches the database for the card information and executes credit administration. The determination of whether card use is allowed, as the result of credit administration, is carried out in the same manner as in the embodiment discussed above, by confirming "report of loss or theft" information and whether the total amount used on the card, including the new transaction amount, exceeds the credit limit of the card. When credit administration results in card use being allowed, computer 400 sends the transaction results and the transaction authorization number to cellular phone 100. The subsequent sequence, including the user validation process, is the same as the process flow shown in FIG. 6 for the first embodiment.

With the configurations of the embodiments discussed above, (1) a series of credit card transaction processes can be completed without providing card information to transaction terminal 300 in the member store, because the credit administration process can use the cellular phone's credit administration processor, and the user validation process can use the cellular phone's user validation processor. Moreover, because the card information is sent directly to the transaction authorization computer 400 from cellular phone 100, the danger of the card information necessary for settlement being stolen can be eliminated and high-security transaction processing becomes possible. (2) Particularly with regard to user identification information, the danger of theft of information necessary for user validation, such as the PIN, through transaction terminal 300 at the member store can be eliminated because user validation, such as through PIN input, is carried out with cellular telephone 100 carried by the card user. Moreover, the user validation process is not possible with a stolen card, because this is a user validation method using a cellular phone 100 that is registered in advance, and fraudulent use of the credit card can be prevented. When both the card and the portable communication terminal are lost, fraudulent use of the card can be prevented by carrying out procedures to prevent the use of the cellular phone. Because the cellular phone is a personal tool that the user will immediately miss if the cellular phone is lost or stolen, measures to prevent fraudulent card use are easy to carry out without delay. (3) With technology using location information for a portable communication terminal, fraudulent use is determined in the case of the use of a credit card, which has been stolen or for which card information has been copied, at a location that is distant from the current location of the valid credit card user carrying a registered communication terminal. The use of the card for a transaction is therefore disallowed and fraudulent use can be prevented. (4) Information for the credit card process, such as credit administration using a portable communication terminal, is registered as card history information; moreover, the addition of the number of uses of the card, the amount paid by the card, the points which can be exchanged for additional services in an advertising campaign, or services such as cash rebates on a certain percentage of the purchase amounts, can be provided to benefit the user, member store, and credit company.

(5) The card user can shop with a high-security credit card system, as well receive the added services as in (4) above. (6) The management side of the card settlement system, such as credit card companies, banks, and insurance companies, will be able to improve customer satisfaction with the increased security, and to reduce losses such as insurance awards to parties damaged by fraudulent card use. (7) The card member stores will see related sales increases from being able to wipe out customer issues such as "wanting to make a purchase but not carrying cash" or "concerns about information leakage in credit card transactions, through dealing with a credit card payment system made safe because of the high security features.

Moreover, the card used in the aforementioned embodiments may be a card having card identity information stored on a plastic card, a card with card information stored as magnetic information on a magnetic strip, a card with card information held in semiconductor memory contained in the card, or the like. The card used is not limited to these physical cards and may also be a virtual card. Furthermore, the credit ID of the user may be shown by means other than a card. Also, the cellular phone used in the aforementioned embodiments may be a digital cellular phone using the PDC (Personal Digital Cellular) system, GSM (Global System for Mobile Communication) system, or CDMA (Code Division Multiple Access), or it may be a simple cellular phone on the PHS (Personal Handyphone System) system, but is not limited to these, and may also be another type of portable communication terminal. Moreover, identity-related verification information such as the telephone number of the portable communication terminal may be stored in removable semiconductor memory in the portable communication terminal and one may replace the semiconductor memory and use the portable communication terminal for its original use.

What is claimed is:

1. A portable communication terminal for making payments using a transaction terminal in a credit card member store, comprising:

a location detector which detects a current location of the portable communication terminal;

a memory which stores the current location information;

a receiver operable to receive from the transaction terminal card information containing information relating to an identity of a credit card user; and a transmitter which transmits the current location information to a host computer, wherein the credit card user is recognized as an authentic cardholder when the location of the portable communication terminal is within a predetermined range from the location of the transaction terminal.

2. A portable communication terminal for making payments using a transaction terminal in a credit card member store and for use in a payment system, comprising:

a location detector which detects current location information of the portable communication terminal;

a memory which stores the current location information;

a receiver which receives card information containing information relating to an identity of a credit card user from the transaction terminal; and a transmitter which transmits the location information, wherein the payment system comprises a host computer, the transaction terminal, and the portable communication terminal, wherein the location information of the portable communication terminal is transmitted to the host computer while the location information of the transaction terminal is stored in a database capable of being accessed by the host computer, wherein the credit card user is recognized as an authentic cardholder when the location of the portable communication terminal is within a predetermined range from the location of the transaction terminal.

3. A portable communication terminal according to claim 2, further comprising a receiver which receives information whether card use is allowed.

4. A portable communication terminal according to claim 2, further comprising a settlement information receiver which receives settlement information, and wherein the transmitter transmits the settlement information received by the settlement information receiver, the location information and the card information.

5. A portable communication terminal according to claim 2, wherein the location information comprises latitude and longitude information.

* * * * *